Feb. 19, 1952 R. O. GREENSHIELDS ET AL 2,586,029
APPARATUS FOR FORMING DROP-CENTER RIMS
Filed Jan. 12, 1949 12 Sheets-Sheet 2

FIG. 8

INVENTORS
Robert O. Greenshields.
Ottmar E. Schmidt
BY John G. Kay
Maurice A. Crews
ATTORNEY

Fig. 12  Fig. 13

INVENTORS
Robert O. Greenshields
Ottmar E. Schmidt
John G. Kay
BY Maurice A. Crews
ATTORNEY

INVENTORS.
Robert O. Greenshields.
Ottmar E. Schmidt.
John G. Kay.
Maurice A. Crews
ATTORNEY Feb. 19, 1952 R. O. GREENSHIELDS ET AL 2,586,029
APPARATUS FOR FORMING DROP-CENTER RIMS
Filed Jan. 12, 1949 12 Sheets-Sheet 8

INVENTORS
Robert O. Greenshields
BY Ottmar E. Schmidt
John G. Kay
Maurice A. Crews
ATTORNEY Feb. 19, 1952     R. O. GREENSHIELDS ET AL     2,586,029
APPARATUS FOR FORMING DROP-CENTER RIMS
Filed Jan. 12, 1949     12 Sheets—Sheet 10

*INVENTORS.*
Robert O. Greenshields
BY Ottmar E. Schmidt
John G. Kay.
*Maurice A. Crewd*
*ATTORNEY*

Feb. 19, 1952   R. O. GREENSHIELDS ET AL   2,586,029
APPARATUS FOR FORMING DROP-CENTER RIMS
Filed Jan. 12, 1949                                        12 Sheets-Sheet 11

INVENTORS
Robert O. Greenshields
Ottmar E. Schmidt
BY  John G. Kay

Maurice A. Crews
ATTORNEY

Feb. 19, 1952 — R. O. GREENSHIELDS ET AL — 2,586,029
APPARATUS FOR FORMING DROP-CENTER RIMS
Filed Jan. 12, 1949 — 12 Sheets—Sheet 12

INVENTORS
Robert O. Greenshields
Ottmar E. Schmidt
John G. Kay
BY Maurice A. Creeved
ATTORNEY Patented Feb. 19, 1952

2,586,029

UNITED STATES PATENT OFFICE 2,586,029

APPARATUS FOR FORMING DROP-CENTER RIMS

Robert O. Greenshields, Detroit, Ottmar E. Schmidt, Grosse Pointe Woods, and John G. Kay, Detroit, Mich., assignors to The Budd Company, Philadelphia, Pa., a corporation of Pennsylvania Application January 12, 1949, Serial No. 70,552

9 Claims. (Cl. 153—2)

This invention relates to apparatus for forming drop-center rims or the like. It is directed especially to the problem of forming a drop-center rim of the type in which the drop-center portion is unsymmetrical and in which the bead seats and tire-retaining flanges are unsymmetrically disposed with relation to the drop-center portion.

In forming rims of the drop-center type by the method preferred and practiced heretofore, a ring of rim stock of suitable width and of a diameter substantially equal to the diameter of the base of the drop center was first subjected to an axial pressing operation to flare the margins outwardly substantially to the ultimate diameter of the edges of the rim. The sides of the drop-center portion were then formed as by rolling, the drop-center portion was completed, and the bead seats and tire-retaining flanges were formed by further rolling operations.

With this prior method, the metal of the stock was thinned considerably by the successive forming operations, especially in the corners. Therefore, in order to prevent undue weakness in the critical corners between the sides of the drop-center portion and the tire bead seat portions, and between the bead seat portions and flanges, the metal of the blank had to be chosen originally of such thickness as to allow such thinning.

Objects of the invention are to provide a machine which produces a lighter rim than could be produced by prior art practices with comparable strength, thereby providing economies in weight and cost, and at the same time to minimize loss by rim failure. Both of these objects are attained through the improved control of rim thickness achieved in practice of the invention.

As an example of the advantage attained in practice of the invention, it may be pointed out that the rim stock for a typical automobile wheel was of a thickness of the order of 0.125", as made by the prior art methods. By the substitution of the method and apparatus of this invention, stock of the order of 0.117" was substituted without sacrifice of the necessary strength, and a substantial reduction in rim failures attained at the same time.

In preferred practice of the invention, we start with a circular rim blank of diameter about midway between the extreme outer and inner portions of the completed rim, and flare the margins gently outward except in the central region which is to form the drop center. The portion laterally within these initially flared margins is then formed radially inwardly to approximately the shape of the drop-center base portion, with inclined portions extending from the drop-center base and merging into the initially flared portions. A single axial die-pressing operation is then performed to shape the bead seats, drop-center sides and flanges of the rim substantially to their final form, this last operation causing the metal to be bent in such manner as to avoid substantial thinning of the critical corners. The apparatus for performing this last operation forms an important feature of the invention and is characterized by floating dies which can be operated to form the rim in a single stroke of a stamping press, these dies allowing the metal to slip along their engaging surfaces and avoid direct compacting action radially of the blank.

The following are important features contributing to the advantageous results of the invention:

(a) The fact that the drop-center base portion is rolled into the annular blank as a preliminary step by a highly localized operation involving a reduction in diameter, thereby minimizing the thinning of the blank in this critical region by reason of the additional amount of metal per unit of circumferential length made available by the reduction in diameter.

(b) The fact that the blank is held during the stamping operation by segmental dies which move inwardly to grip the blank before the die stamping operation is actually commenced, but play no part in the actual die stamping operation except to fulfill their function as a blank support.

(c) The fact, as indicated above, that the die stamping operation by which the blank is formed substantially to its final shape is essentially a bending operation in which the forces acting upon the blank are axial in direction.

Further objects and advantages and the manner in which they are attained will become apparent from the following detailed description when read in connection with the accompanying drawings.

In the drawings, the apparatus is shown as applied to the production of a drop-center rim of assymetrical form in which the drop-center base is located to one side of the central plane of the rim, but it will be understood that it is also applicable to the formation of symmetrical drop-center rims by merely substituting dies of the proper configuration.

Figure 1:
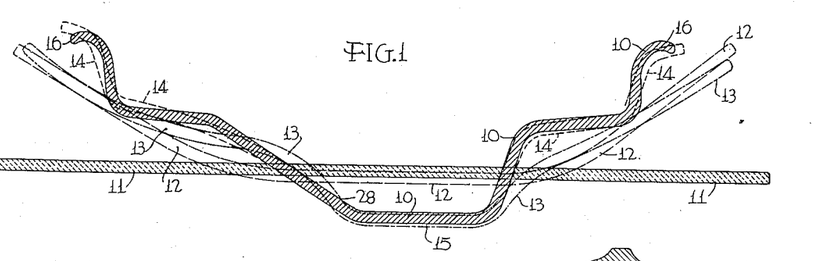
Figure 1 is a combined cross-section and diagrammatic view, illustrating the shape of the rim blank in cross-section, and superposed thereon the contours of the transverse cross-section during successive stages of the forming operation.

The finished drop-center rim to be formed by the novel apparatus is designated in Figure 1 generally by the reference numeral 10, the annular cylindrical blank from which it is formed by 11, and the shapes intermediate between blank 11 and the finished rim 10 by 12, 13 and 14. Figure 1 shows the relative diameters as well as cross-sectional shapes at these successive manufacturing stages, by reference to the base line 11 of the original blank.

It will be seen that the diameter of the annulus 11 is substantially greater than the diameter of the base 15 of the drop-center in the finished rim but less than the diameter of the rim flange margins 16, 16. This annulus 11 may be fashioned by bending a flat strip into circular form and welding the abutting edges together.

Figure 2:
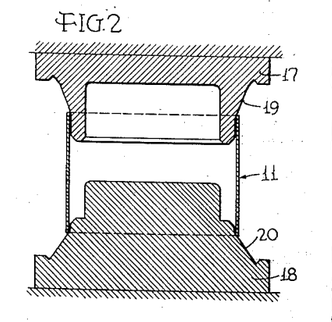
Figure 2 is a diagrammatic view in axial cross-section showing the blank and dies in position for the first forming operation.
Figure 3:
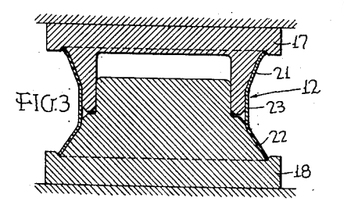
Figure 3 is a similar view of the blank and dies at the completion of the first forming operation.

The annulus is first subjected to the forming operation illustrated in Figures 2 and 3. In this operation, the dies 17 and 18, having frusto-conical working faces 19 and 20, respectively, are brought together against the inner surface of the annulus as shown in Figure 3 to form the flared margins 21 and 22, the central or drop-center base portion 23 of the blank being left substantially unchanged.

Figure 4:
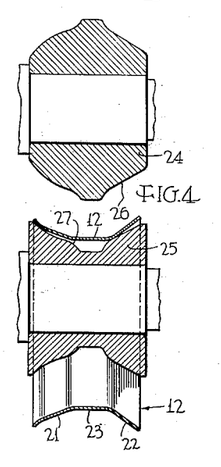
Figure 4 is a diagrammatic view in axial cross-section showing the blank formed by the first operation in position between the rolls used in the second forming operation.
Figure 5:
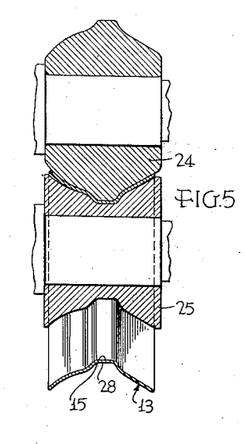
Figure 5 is a similar view of the blank and rolls after the completion of the second forming operation.

This intermediate blank 12 is next subjected to the second forming operation, as shown in Figures 4 and 5. This second forming operation comprises rolling the blank 12 between rolls 24 and 25 having, respectively, projecting and re-entrant faces 26 and 27 complemental to each other to shape the blank to the form shown in Figure 5, as indicated in Figure 1 by the numeral 13.

Figure 22:
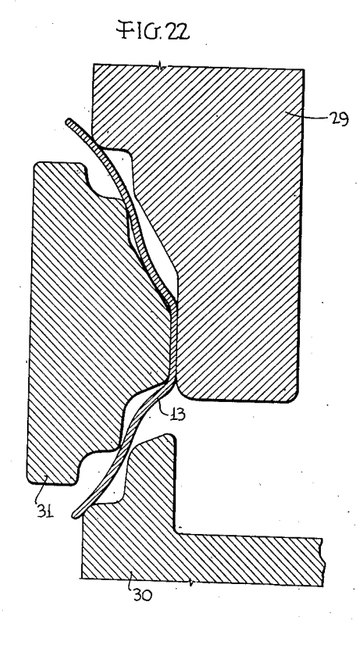
Figures 22 to 25, inclusive, are detail sectional views through the dies and the work at successive stages of the final approach movement of the dies.
Figure 23:
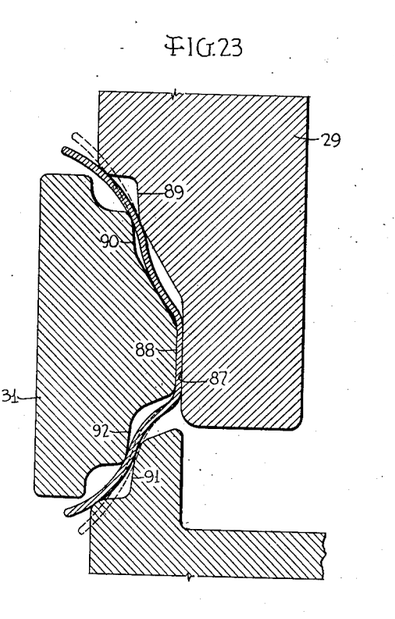
Figure 24:
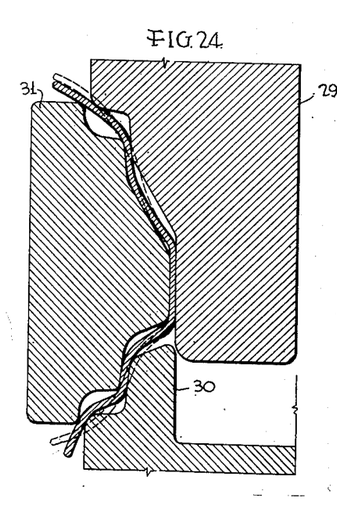

In this second operation, the metal of the blank is depressed to a smaller diameter in the region of the drop-center portion of the rim, and this depressed portion 28 is reduced at its base 15 approximately to the diameter of the base of the drop-center of the completed rim. From this depressed base portion the sides of the drop-center flare outwardly as illustrated in Figures 5 and 22, for example.

It will be seen that these first two operations impose a minimum of strain on the metal, and that the tendency of the rolling operation of Figures 4 and 5 to thin the blank is largely offset by the fact that it is accompanied by a reduction in diameter at the drop-center which makes more metal available.

Figure 25:
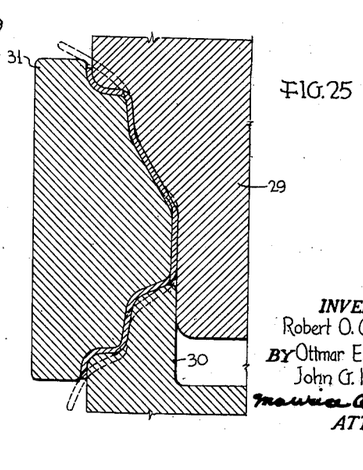
Figure 26:
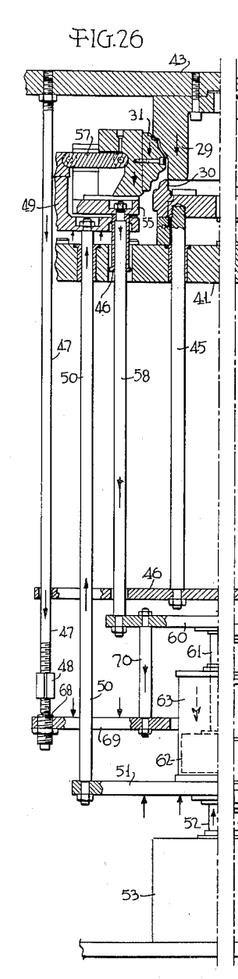
Figure 26 is a sectional view of the left-hand side of the apparatus showing the safety stop arrangement to avoid clashing of the dies if the apparatus is operated with no workpiece in position.
Figure 27:
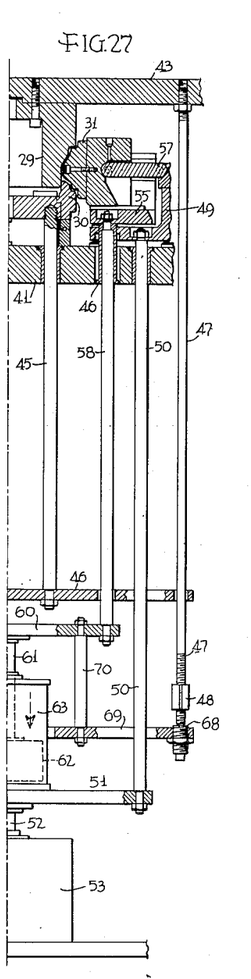
Figure 27 is a similar view of the right-hand side, with the dies moved to the closed position.
Figure 28:
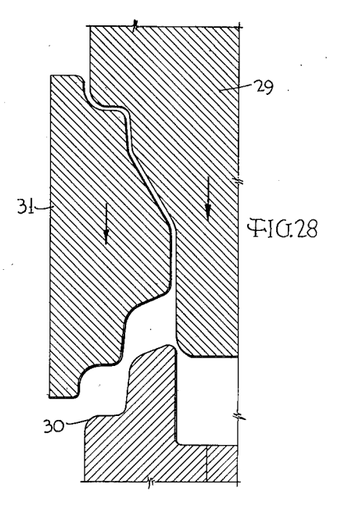
Figures 28 and 29 are enlarged fragmentary sectional views of the dies in the positions shown, respectively, in Figures 26 and 27.
Figure 29:
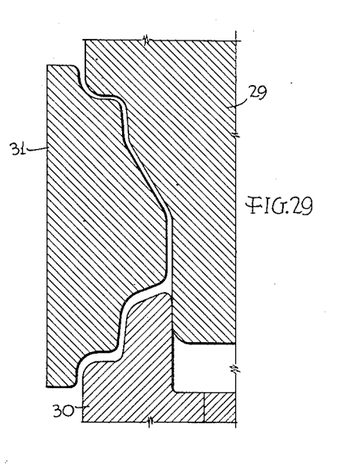

The blank 13 resulting from the operation of Figures 4 and 5 is particularly well adapted for formation to substantially the final form of the rim by the ensuing die stamping operation. To this end, it is subjected to the operation illustrated in Figures 6 and 22 to 25, in which it is formed by opposed axially movable stamping dies 29 and 30 (Figure 25) while held on its outer face by correspondingly contoured segmental, floating dies 31, which close in to their final positions in gripping the blank before the actual stamping operation by axially opposed dies 29 and 30 is commenced. In this operation there is substantially no drawing or thinning of the metal over the corners of the dies, since the opposed faces of the dies are spaced sufficiently more than the thickness of the metal to make this operation little more than a bending operation by forces applied axially. This will be made clearer hereinafter in the detailed description of the action of the apparatus controlling the movements of these dies. As shown by the dot-and-dash outline, Figure 1, the blank 14 as it emerges from this die operation has the contour of the completed rim, except for slight deviations such as spring-back and the marginal contour of the flanges. To bring it to the final form, it is subjected to the rolling operation shown in Figure 7, between opposed rolls 32 and 33, contoured to the exact form of the desired final rim contour.

Figure 6:
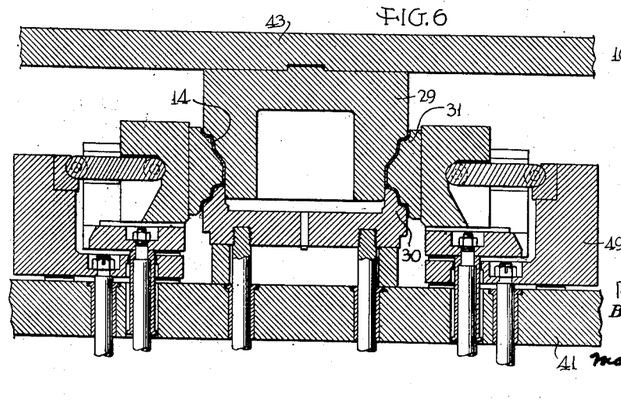
Figure 6 is a diagrammatic axial section through the dies and blank after the completion of the third forming operation.
Figure 7:
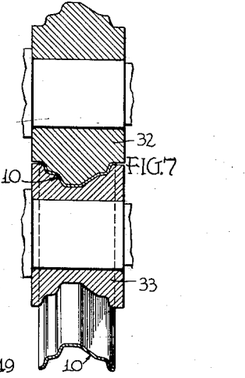
Figure 7 is a similar view of the completed rim between the rolls used in a final forming operation.

The operation shown in Figure 6 is a very important step in the method, and is carried out by a novel apparatus which will now be described in detail, particular reference being made to Figures 8 to 29, inclusive. This apparatus comprises a novel arrangement of forming dies with means for moving them between open and closed positions with a workpiece in position between them, the apparatus providing suitably timed movement of the dies and bringing one of the dies in position so the workpiece can be readily fed thereto and removed therefrom.

Figure 8:
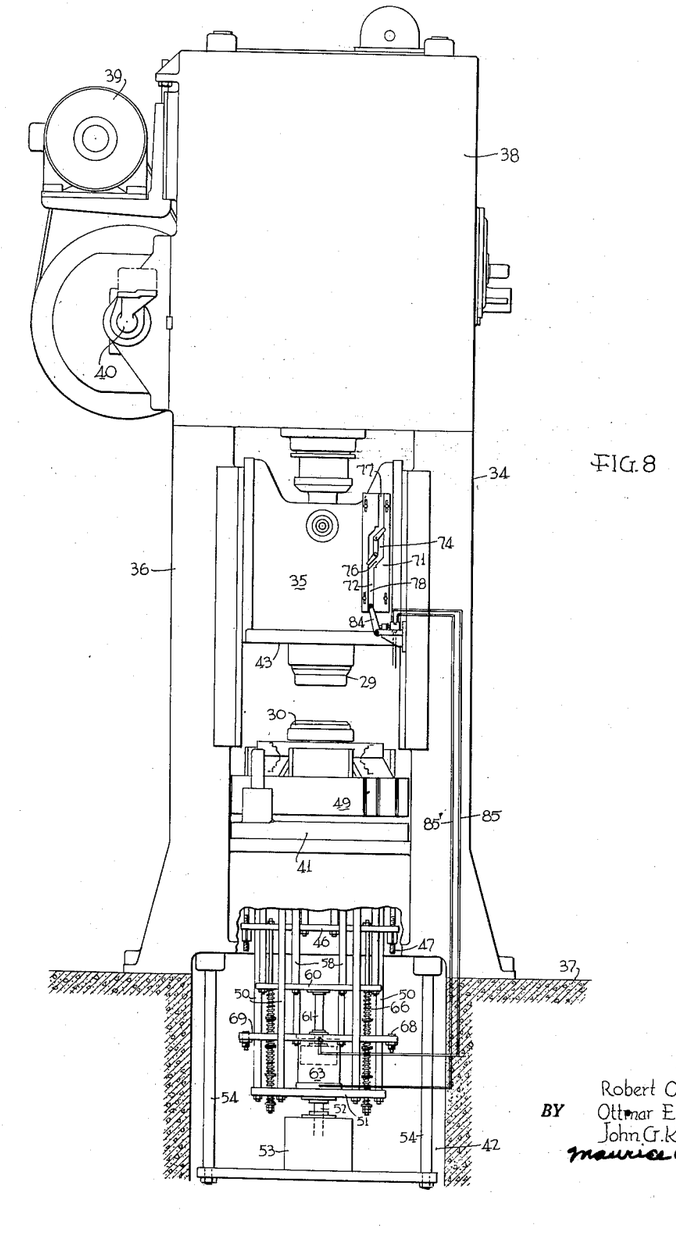
Figure 8 is an elevational view, parts being broken away, of a press with which the operation shown in Figure 6 is performed.

As indicated in Figure 8, the dies are associated with a single-action vertical press, designated generally by the numeral 34, the plunger 35 of which is reciprocated within vertical columns 36 supporting the press from the foundation 37. These columns 36 support the head 38 carrying the crankshaft (not shown) for reciprocating the plunger 35. The motor 39 operates the crankshaft in the usual way through a clutch-driven countershaft 40 and gearing (not shown) to effect a complete working and return stroke of the plunger. The dies are mounted partly on the plunger and partly on the bed 41 of the press, and the control of the movement of the dies is partly through the reciprocation of the plunger and partly through other means connected thereto and extending below the bed of the press into a well 42 formed in the press foundation 37.

Figure 9:
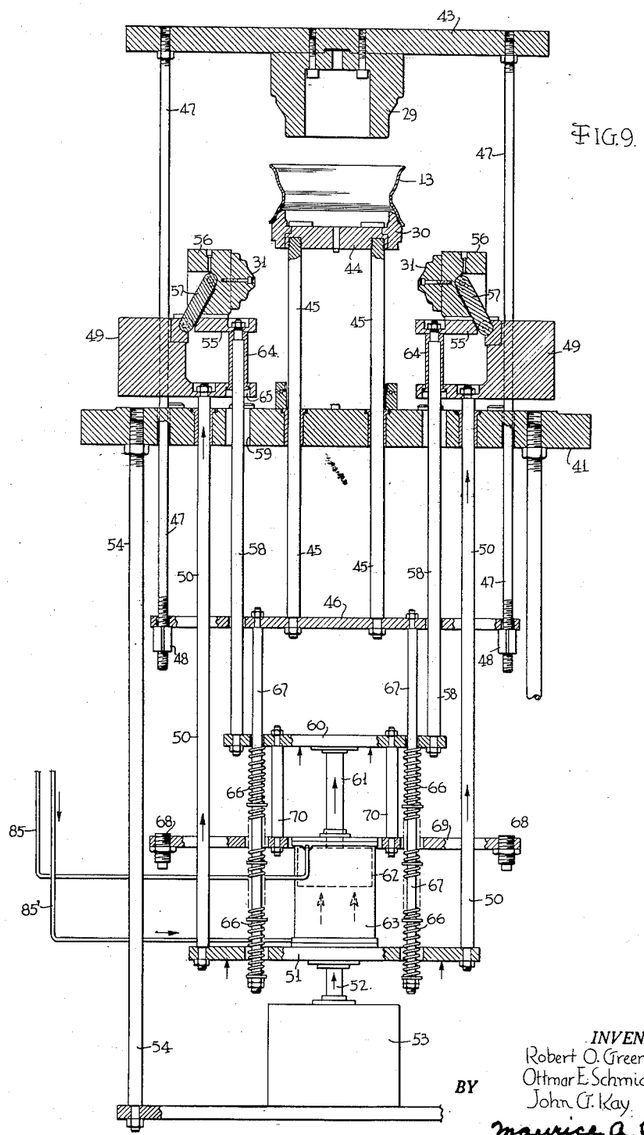
Figure 9 is a detail axial sectional view through the dies and operating means therefor, with the dies and workpiece in the initial position.

Referring now to Figures 8 and 9, where the parts are shown in the initial position, the upper die 29 is shown removably mounted on a plate 43 secured in turn to the bottom face of the plunger 35 of the press. The workpiece, which is the blank resulting from the operation of Figures 4 and 5, as shown at 13 in Figure 1, is seated on the lower die 30, which is secured to a plate 44. The latter is secured to a plurality of vertical rods 45, 45 (Figure 9) slidably mounted in openings in the bed plate 41 of the press and extending some distance below it, where they are secured to a plate 46. The plate 46 is in turn supported by vertical rods 47 extending upwardly through openings in the bed plate 41 and secured at the top to the plate 43 carried by the press plunger. The lower ends of these rods 47 pass loosely through openings in the plate 46 and are screw-threaded to receive adjustable screw abutments 48 upon which the plate 46 rests.

The outer closing-in dies 31 are mounted upon a base block 49 which is normally held in raised position spaced a short distance above the bed plate 41 by slidable rods 50 secured thereto and slidably guided through the bed plate.

At their lower ends, the rods 50 are secured to a plate 51 which is in turn supported by the piston rod 52 of an air cushion cylinder 53 which may be supported from the bed plate 41 by the rods 54. The pressure of the air under the piston of this cylinder normally holds the block 49 in the raised position shown in Figure 9.

The outer closing-in dies 31 are held in the raised position shown in Figure 9 by a plate 55, upon which segmental die-supporting blocks 56 carrying the segmental dies 31 are slidably held and guided for in-and-out movement. Such in-and-out movement is effected by the links 57, pivoted to the respective blocks 56 and to the base block 49, whenever the plate 55 is raised or lowered relative to block 49.

The plate 55 is held in its raised position by rods 58 connected thereto and passing down freely through relatively large openings 59 in the base plate. These rods are secured at their lower ends to a plate 60 which is in turn supported by the piston rod 61 of piston 62 mounted for reciprocation in cylinder 63, which is secured to plate 51. The admission of air selectively to opposite ends of the cylinder 63 is suitably controlled by the vertical movement of the press plunger 35 carrying plate 43 and upper die 29, as will be described later.

Figure 13:
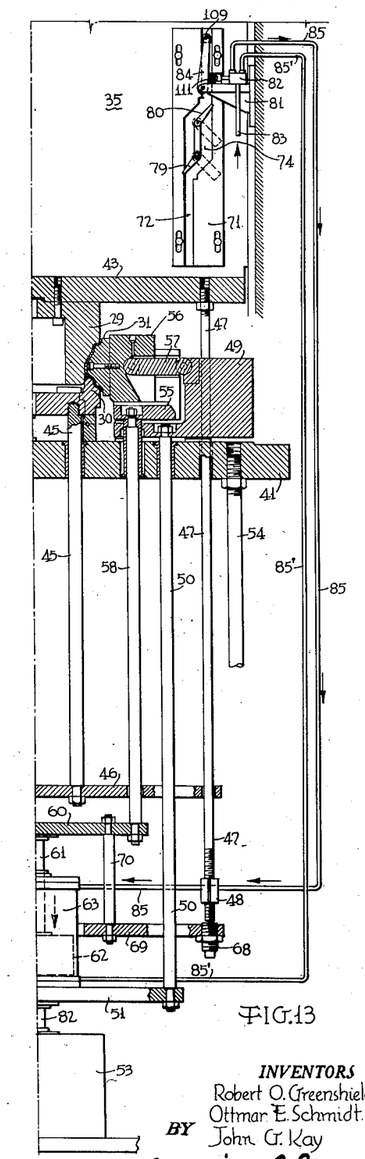
Figure 13 is a similar view of the right-hand portion, with the dies closed in upon the workpiece after forming it.

Upward movement of the rods 58 is limited by sleeves 64 secured to the upper ends of the rods 58 and having shoulders at their lower ends for engagement with the bottom of recesses 65 in the base block 49 (see Figure 9). The mounting of the segmental closing-in dies 31 is illustrated in greater detail in Figures 17, 18, 19 and 20. As shown in these figures, the links 57 have been moved to their horizontal positions, as illustrated in Figure 13, by the downward movement of the plate 55 relatively to the base block 49, the supporting blocks 56 on which the segmental dies are mounted being moved inwardly from the dotted-line to the full-line position of Figure 21 by this action.

The operation of the mechanism for timing the admission of air to opposite ends of the cylinder 63 to effect lowering and raising and in-and-out movements of the closing-in dies 31 is best illustrated in Figures 8 and 12 to 15 of the drawing. This timing is controlled by the movements of the plunger 35 of the press carrying the upper die 29, and is accomplished through an island cam 71 which is adjustably secured to the plunger 35. The cam 71 has a cam groove 72 with intermediate parallel portions 73 and 74 connected through inclined portions 75 and 76, respectively, to vertical end portions 77 and 78. Suitably weighted switch levers 79 and 80 (Figs. 12, 13) normally close the communication between the portions 73 and 78 and the portions 74 and 77, respectively, so that the cam roller 109 follows the path 78, 76, 74, 77 in the lowering of the ram and the path 77, 75, 73, 78 in the raising of the ram. A bracket 81 is supported from a pillar 36 of the press and carries a valve casing 82 connected on the one hand to a compressed air line 83 and on the other to air lines 85 and 85' leading, respectively, from the valve casing 82 to the spaces between the top and bottom, respectively, of the cylinder 63 and adjacent surfaces of the piston 62. The valve in casing 82 is designed to connect one line or the other (85 or 85') to the compressed air line 83 to move piston 62 up or down, as controlled by the movement of the plunger 35 carrying the upper die 29. This control is effected by a roller follower 109 which is received in the cam groove 72. This roller follower is mounted in the end of a lever 84 pivoted to the bracket 81, the lever 84 being in cooperative relation to a roller 111 in the end of the stem of the valve in casing 82. This valve is normally moved outwardly by a spring (not shown) either to the operative position illustrated in Figure 14 or to the position illustrated in Figure 15, depending upon the stage which the operation of the automation has reached.

In the operation of the apparatus illustrated in Figures 8 to 29 of the drawing, when the plunger of the press is in the raised position of Figure 8, the valve-operating lever 84 will be at the bottom of the cam groove 72, as illustrated in that figure. In this position, the valve 82 admits compressed air from pipe 83 through pipe 85' to the bottom of cylinder 63, so that piston 62 and the parts connected thereto are in the raised position shown in Figure 9. A workpiece 13 is now placed in position on the raised lower die 30 and the press control is operated to cause plunger 35 with plate 43 and upper die 29 to execute a reciprocating stroke and stop again at the upper position of Figure 9, as is usual in vertical press operation.

Figure 10:
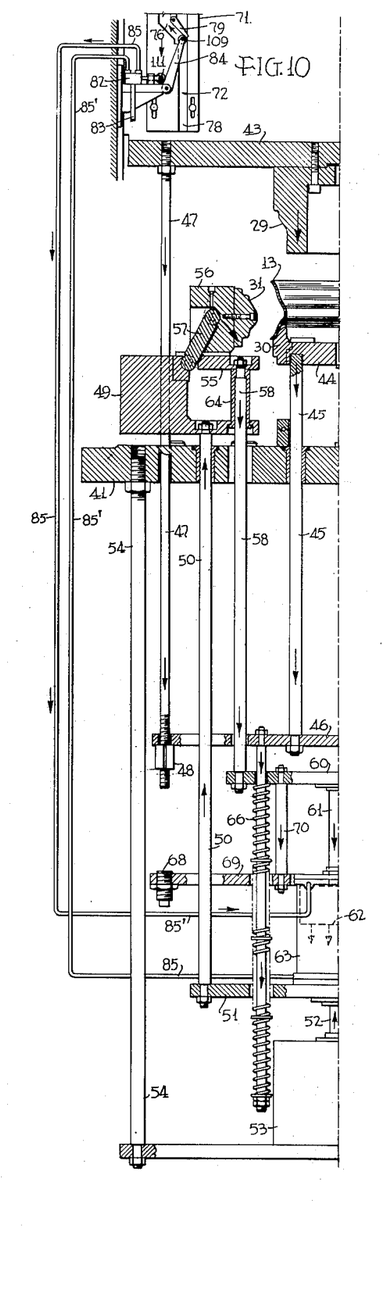
Figure 10 is a similar view of the left-hand portion of the dies and workpiece with the dies started toward closing position upon the workpiece.

The upper die 29 and lower die 30 first move down together, as illustrated in Figure 10, the threaded stops 48 on the lower ends of rods 47 permitting such downward movement. As the lower die reaches a position which is substantially opposite the raised position of the closing-in dies 31, as illustrated in Figure 10, the follower 109 on valve-operating lever 84 passes from the lower portion 78 of the cam groove through the inclined portion 76 into the vertical portion 74, 77 (Figure 12), and in doing so operates roller 111 to actuate the valve to a position in which air is cut off through conduit 85' and admitted through conduit 85 to the upper end of cylinder 63. This, operating through piston 61, plate 60 and rods 58, causes downward movement of plate 55, with resulting swinging of links 57 toward the horizontal positions illustrated in Figures 12 and 13. This swinging movement of links 57 carries blocks 56 and dies 31 inwardly along the guideways provided by plate 55 (see Figure 18), with the result that the dies 29, 30 and 31 reach the position shown in Figure 12, with the blank 13 located between the dies but no work performed upon it as yet.

Figure 12:
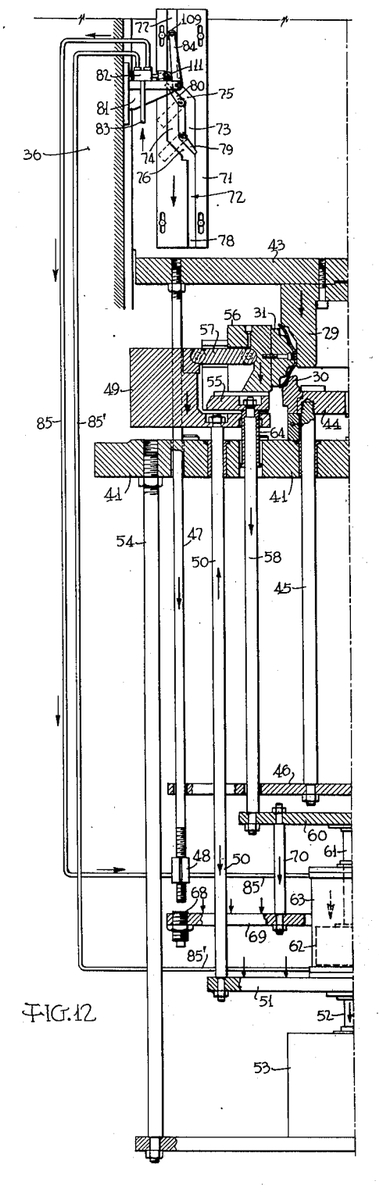
Figure 12 is a similar view of the left-hand portion, with the dies closing in on the workpiece.
Figure 20:
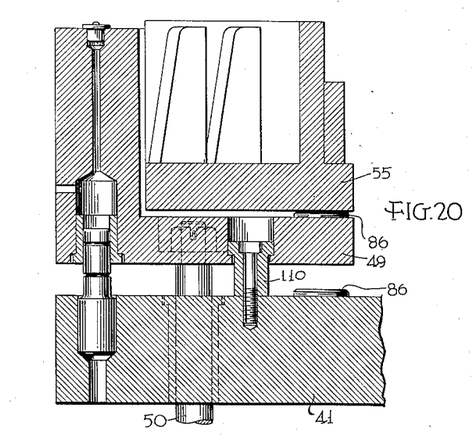
Figure 20 is an enlarged sectional detail view on the line 20—20 of Figure 17.
Figure 21:
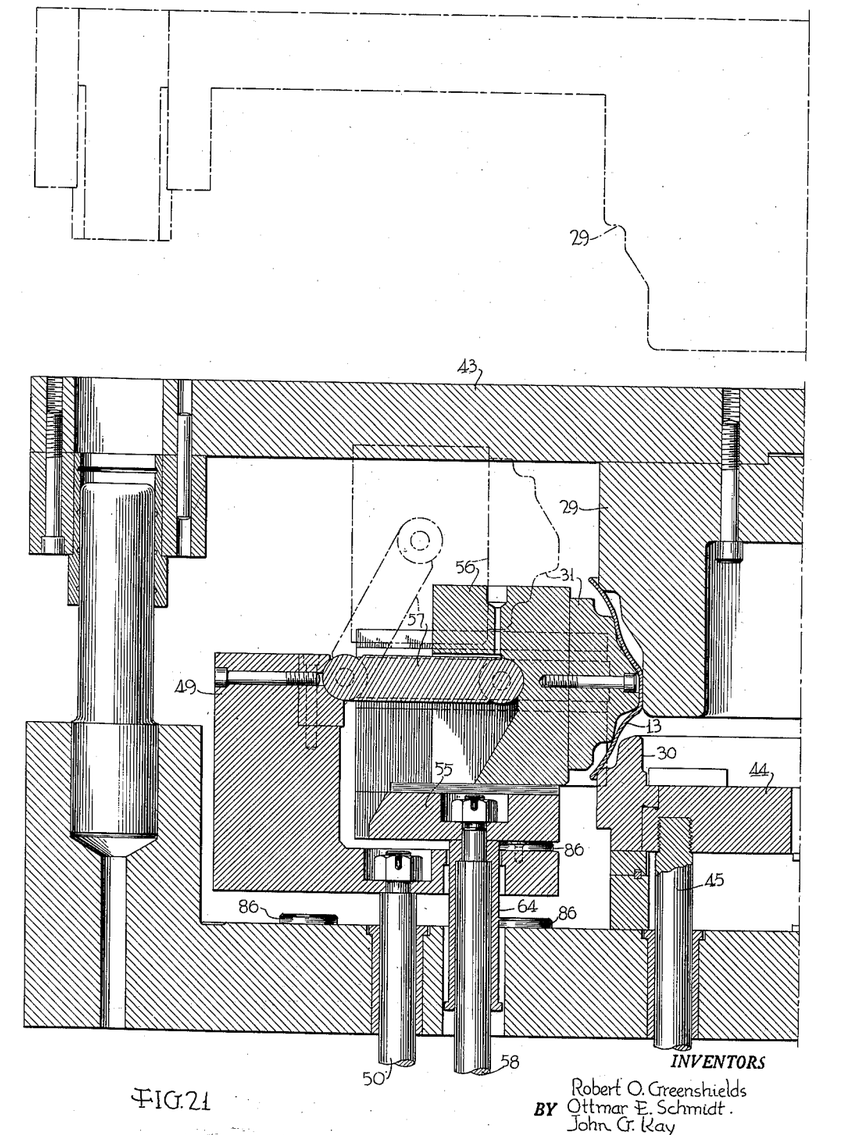
Figure 21 is an enlarged sectional view in which the dies are shown in a position similar to that shown in Figure 12.

At the stage illustrated by Figure 12, the closing-in dies have reached their innermost positions in which the links 57 extend horizontally and the plate 55 is bottomed on the upper pads 86 (see Figure 20). As shown in the enlarged view of Figure 22, it is clear that in this position of the dies they grip the blank 13 through their inner surfaces, which serve during the movement of the dies from the position of Figure 12 to the position of Figure 13 to hold the blank in position while dies 29 and 30 bend it about horizontal axes to cause it to conform to the shape of the dies 31 in portions not previously gripped. The working of the blank by relative approach movement of the dies from the the relative positions illustrated in Figure 12 to those illustrated in Figure 13 is best shown in Figures 21 to 25 of the drawing. It will be seen from these views that this forming operation is effected principally by a bending of the metal in which the portions adjacent the upper and lower edges of the blank are first contacted by the surfaces of dies 29 and 30, and the blank is then progressively contacted toward the center during the bending operation against the segmental holding dies 31. In this operation, there is little if any drawing of the metal over the corners of dies 31, and indeed there is a certain tendency to compact the metal axially incident to this die stamping operation, and thus to reinforce the blank at the critical corners. The opposed, substantially cylindrical faces 87—88, 89—90 and 91—92 (Figure 23) of the dies are in practice spaced slightly further apart than the thickness of the metal of the workpiece, so that the workpiece is not firmly held or compacted by these faces in the final forming movement of the dies from the position shown in Figure 22 to the position of the formed workpiece 14 shown in Figure 25. By reason of these clearances and confinement of the working in the press to a bending action, we are able to avoid substantial thinning of the corners of the workpiece; and the invention presents a contrast to prior art operations in this particular.

Figure 14:
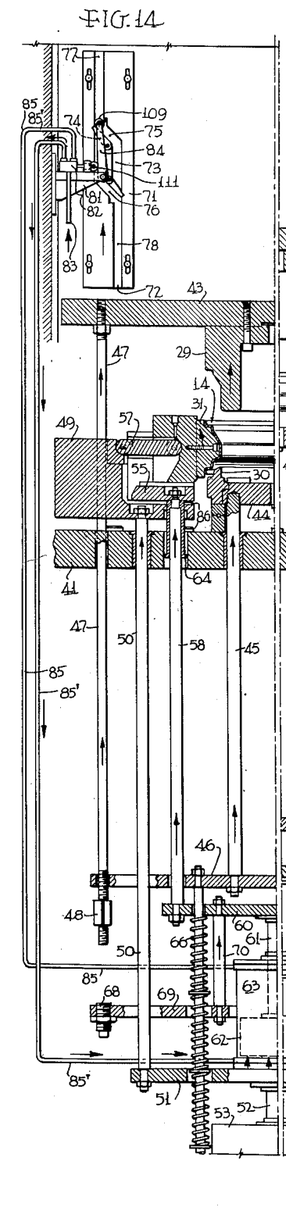
Figures 14, 15 and 16 are partial sectional views showing the dies in various stages of their opening movement after the forming of the workpiece thereby, Figure 14 showing the position as the outer dies start to open, Figure 15 showing the workpiece transferred to the lower die, and Figure 16 showing the workpiece raised to the unloading position.
Figure 15:
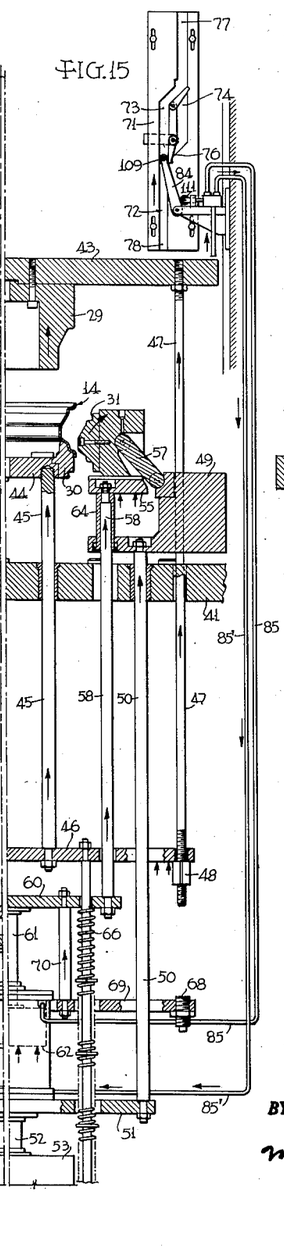
Figure 16:
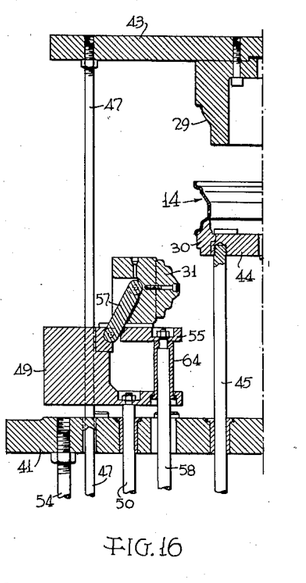
Figure 17:
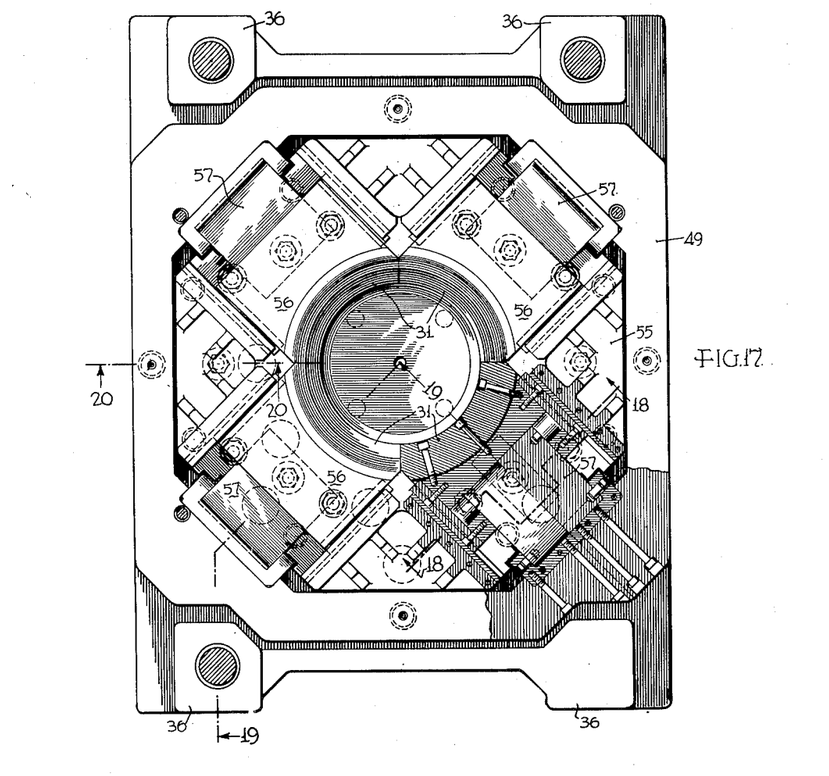
Figure 17 is a view partly in cross-section and partly in plan, showing the outer closing-in dies in closed position.
Figure 18:
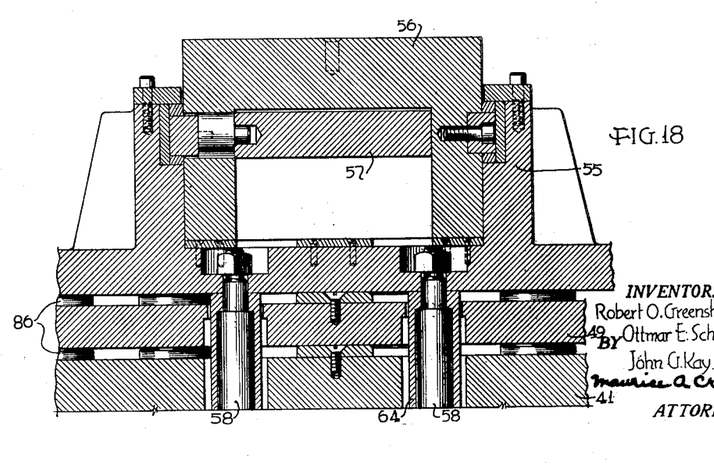
Figure 18 is a sectional detail view on the line 18—18 of Figure 17.
Figure 19:
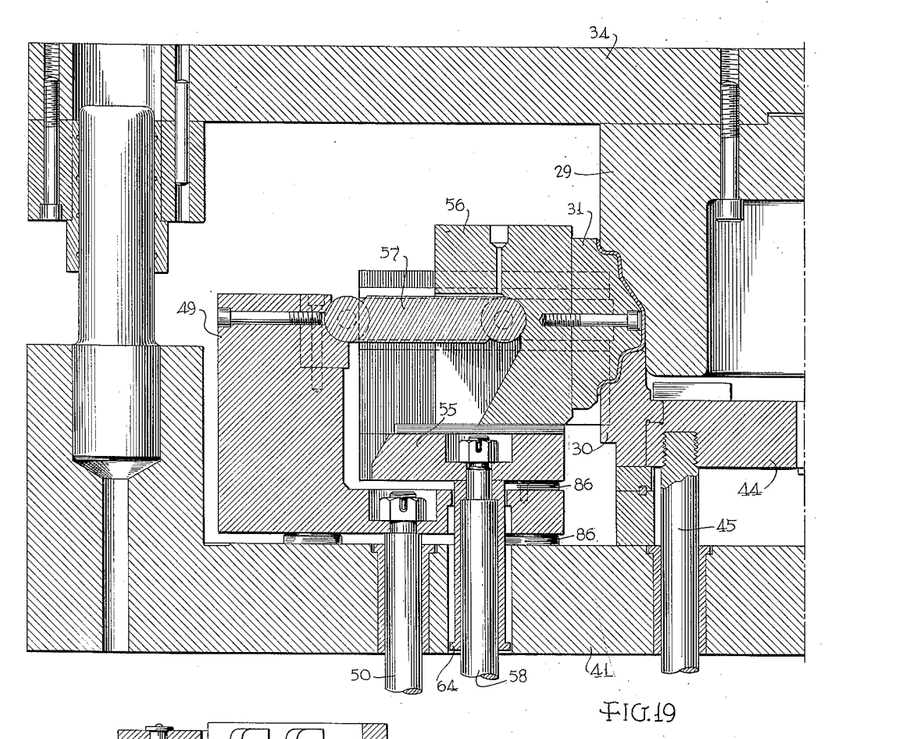
Figure 19 is an enlarged sectional detail view on the line 19—19 of Figure 17.

The sequence of operations in the return stroke of the press is illustrated in Figures 14, 15 and 16. As shown in Figure 14, the upper die 29 connected to the plunger 35 is lifted away from the work in the first step of the return stroke. In this movement, the formed rim 14 is effectively stripped from the upper die by reason of the fact that the segmental dies 31 are entered in the rim during this stage of the operation, and prevent it from being withdrawn by die 29. As the die 29 recedes, the air below the piston in air cushion cylinder 53, acting through plate 51 and rods 50, causes base plate 49 to rise to the position illustrated in Figure 14, in which the rim 14 clears the lower die 30. This upward movement is limited by stop 110 (Figure 20). As the upper die and associated cam 71 continue to rise, the roller 109 on the valve-controlling arm 84 enters the inclined portion 75 of the cam groove 72. This causes movement of lever 84 from the position illustrated in Figure 14 to that illustrated in Figure 15, with the consequence that the follower 111 actuates the valve in casing 82 to cut off access of air through pipe 85 and admit air through pipe 85', thereby raising plate 60, rods 58 and plate 55, and swinging links 57 with associated dies 31 from the positions illustrated in Figure 14 to the positions illustrated in Figures 15 and 16, successively. At the completion of the upward stroke of the ram, the respective parts will occupy the positions illustrated in Figure 16. In this upper position of the lower die 30, the formed rim 14 may be removed readily, and a new workpiece 13 substituted for repetition of the operation.

Figure 11:
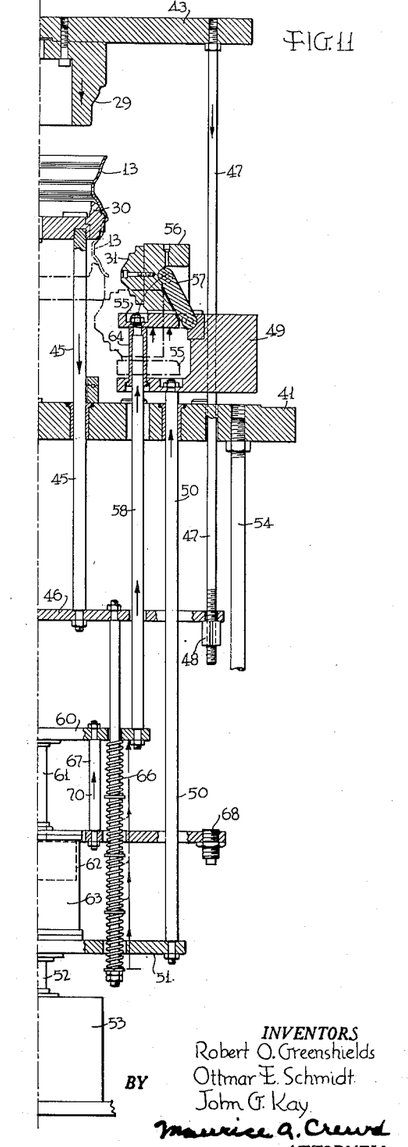
Figure 11 is a similar view of the right-hand portion, illustrating the safety means preventing premature inward movement of the outer dies in the event of air failure.

The machine includes safety features to prevent damage to the dies in case of failure of air pressure under piston 62 during downward stroke of the ram and to prevent damage to the dies in case the press is operated without a workpiece in place. If failure of air pressure within cylinder 63 should occur incident to descent of the ram and upper die 30, there might be damage to the dies caused by clashing between the under side of the die 30 and the upper sides of segmental dies 31, as illustrated in dot-and-dash lines in Figure 11. This is prevented by providing a series of springs 66 surrounding rods 67. These rods are secured to plate 46 and through rods 45 to the lower die 30 in the event of failure of air pressure under piston 62, the springs 66, acting on plate 60 as shown in Figure 11, maintain the closing-in dies 31 in the raised position shown, thereby avoiding the undesirable clashing action illustrated in dot-and-dash lines in Figure 11.

In order to prevent clashing of the dies in the event the press is operated to close the dies when no workpiece is in position between them, adjustable stops 68 are provided on a plate 69. These stops 68 are vertically aligned with the rods 47. Plate 69 is in turn supported from plate 60 by short rods 70. As illustrated in Figures 26 to 29 of the drawing, approach of the upper die 29 to the dies 31 to a spacing closer than that normally provided by the workpiece will result in depression of stops 68 and plate 69 by the lower ends of the rods 47, with the consequence that rods 70, plate 60, rods 58 and dies 31 are depressed to prevent the threatened clash.

To summarize the basic steps involved in use of the machine, the upper die 29 and lower die 30 descend together from the positions of Figure 9 until die 30 is supported upon bed plate 41 as illustrated in Figure 12. During this movement from the relative positions of Figure 9 to those of Figure 12, the dies 31 move downwardly and radially inwardly, and enter the pre-formed drop-center base as they complete that movement. After dies 30 have bottomed on bed plate 41, as illustrated in Figure 12, die 29 continues to descend until dies 29, 30 and 31 occupy the positions there illustrated, just prior to the stamping operation. As the ram and die 29 continue to descend from this position, the die 29 bends the blank 13 about horizontal axes as illustrated in Figures 22-25. This bending is obtained by reaction against dies 31, floatingly supported by air cushion 53. At the same time, pressure is transmitted by the ram and upper die through the rim blank to dies 31 to depress them and cause similar bending of the lower portion of the blank by die 30 as the dies move from the relative positions of Figure 22 to those of Figure 25. Since the base block 49 supporting dies 31 is floatingly mounted during this stamping action, there will be equalization between the bending forces applied through dies 29 and 30, with the result that stress or flow which would otherwise cause weakening of the blank at the critical corners is avoided.

Figures 30, 31, 32:
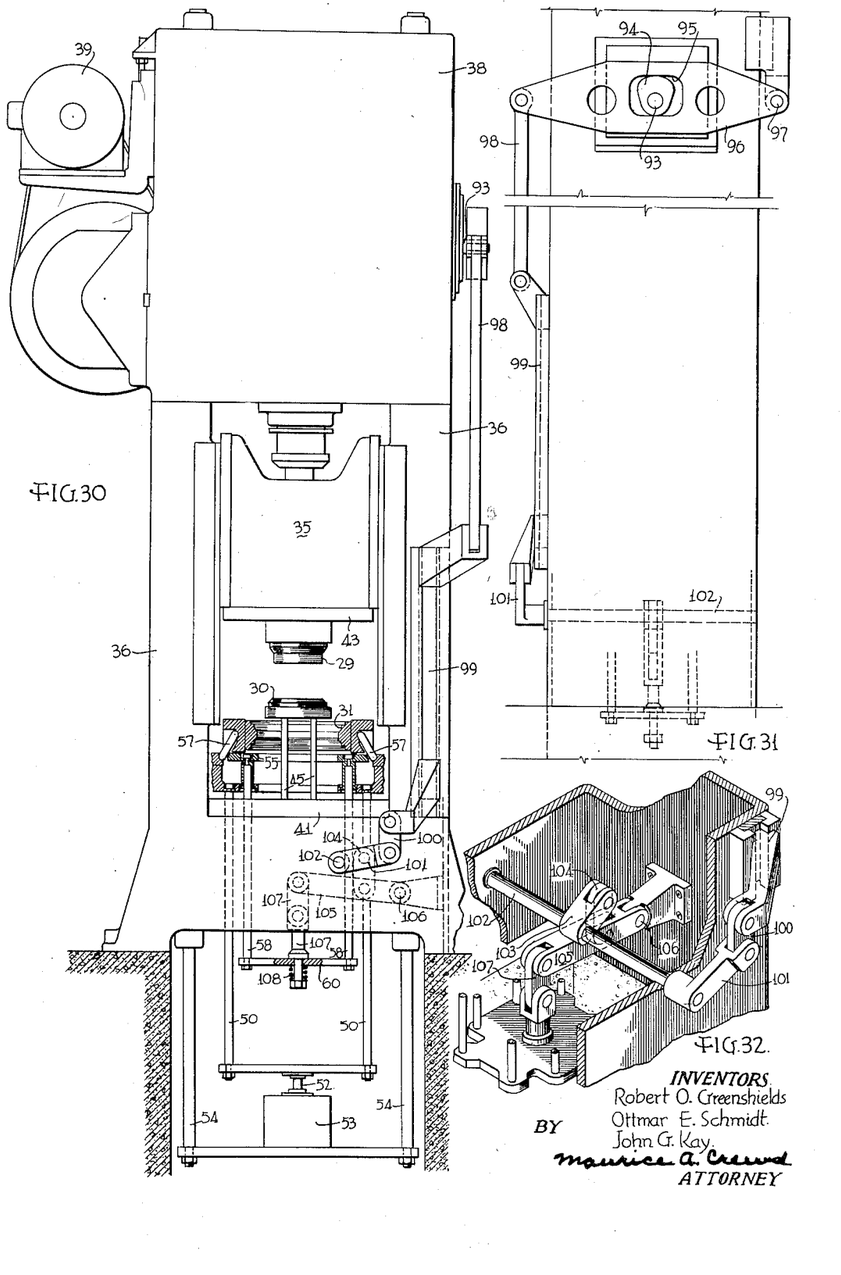
Figure 30 is a view, partly in elevation and partly in section, of a modified apparatus in which the movement of the dies is controlled from the power take-off shaft of the press.
Figure 31 is a partial side elevational view of the press as seen when looking from the left of Figure 30.
Figure 32 is an enlarged perspective view, with parts in section, of a detail of the mechanism used in this modification of Figures 30 and 31.

In the modification of Figures 30, 31 and 32, there is shown a somewhat different arrangement for operating the plate 60 connected to the plate 55 on which the dies 31 are mounted. Here, instead of using an air cylinder controlled by a timing cam on the plunger of the press to operate the plate 60, a connection is provided from a power take-off shaft 93 of the press. The shaft 93 rotates at the same speed as the crankshaft of the press or may, indeed, be one end of said shaft. A suitable cam 94 is provided on shaft 93, and fits into a rectangular opening 95 in the middle of a lever 96 pivoted at one end, as at 97, on the press head. The opposite end of lever 96 is thus made to oscillate up and down in desired timed relationship with the stroke of the press, and this end is connected through a link 98 and associated connections to plate 55. These connections may include a slide 99 reciprocably mounted on an adjacent press pillar 36. Slide 99 is in turn connected through its lower end by suitable levers and links with the plate 60. This connection between the slide 99 and the plate 60 is shown as comprising a link 100 connecting the bottom of the slide to an arm 101 on a shaft 102 carried by the bottom of the press. This shaft has a central crank arm 103 secured thereto and connected by a link 104 to the intermediate portion of an arm 105, pivoted at 106 to a bracket secured to the press wall and having its other end connected by a pin to a link 107 connected to the center of the plate 60. This connection may have a slight lost motion cushioned by a spring 108 to prevent sudden shocks in the upward movement of the plate 60.

Except for substitution of this mechanical movement of plate 60 and dies 31 for the fluid-pressure control by cylinder 63 in the embodiment of Figures 1–29, this modification is similar to that embodiment.

It is to be understood that the present invention is not limited to the embodiments shown and described, and that various modifications and refinements may be employed in practice without departing from the spirit of the invention.

What is claimed is:

1. In a machine for forming a drop-center rim from an annular blank having a radially depressed annular portion intermediate its edges of substantially the diameter of the desired drop-center base, and tapering portions between said depressed portion and opposite edges of the blank, the combination comprising a set of segmental dies mounted radially outside a blank-working position, means for moving said dies radially inwardly into a position in which they contact the depressed portion of said blank, a pair of dies axially movable through said blank-working position and including an upper die and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower die to be contacted by said segmental dies as aforesaid, and means for thereafter imparting relative movement in opposite directions to said upper and lower dies relatively to said segmental dies whereby to force said upper and lower dies against oppositely tapering portions of the interior of the blank to force said portions against said segmental dies, and bend said tapering portions oppositely to the desired shape.

2. In a machine for forming a drop-center rim from an annular blank having a radially depressed annular portion intermediate its edges of substantially the diameter of the desired drop-center base, and tapering portions between said depressed portion and opposite edges of the blank, the combination comprising a set of segmental dies mounted radially outside a blank-working position, means for moving said dies radially inwardly into a position in which they contact the depressed portion of said blank, a pair of dies axially movable through said blank-working position and including an upper die and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower die to be contacted by said segmental dies as aforesaid, and means for thereafter imparting relative movement by equalized pressure in opposite directions to said upper and lower dies relatively to said segmental dies whereby to force said upper and lower dies against oppositely tapering portions of the interior of the blank to force said portions against said segmental dies, and bend said tapering portions oppositely to the desired shape.

3. In a machine for forming a drop-center rim from an annular blank having a radially depressed annular portion intermediate its edges of substantially the diameter of the desired drop-center base, and tapering portions between said depressed portion and opposite edges of the blank, the combination comprising a set of segmental dies mounted radially outside a blank-working position, means for moving said dies radially inwardly into a position in which they contact the depressed portion of said blank while floating axially, a pair of dies axially movable through said blank-working position and including an upper die and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower die to be contacted by said segmental dies as aforesaid, and means for thereafter imparting relative movement in opposite directions to said upper and lower dies relatively to said axially floating segmental dies whereby to force said upper and lower dies against oppositely tapering portions of the interior of the blank to force said portions against said segmental dies, and bend said tapering portions oppositely to the desired shape.

4. In a machine for forming a drop-center rim from an annular blank having a radially depressed annular portion intermediate its edges of substantially the diameter of the desired drop-center base, and tapering portions between said depressed portion and the opposite edges of the blank, the combination comprising a set of segmental dies mounted radially outside a blank-working position, fluid-pressure means for holding said dies normally in said outside radial position and for moving said dies radially inwardly into a position in which they contact the depressed portion of said blank when the machine is operated, a pair of dies axially movable through said blank-working position and including an upper and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower die to be contacted by said segmental dies as aforesaid, and means for imparting relative movement in opposite directions to said upper and lower dies relatively to said segmental dies after the blank is contacted by said segmental dies, whereby to force said upper and lower dies against oppositely tapering portions of the interior of the blank.

5. In a machine for forming a drop-center rim from an annular blank having a radially depressed annular portion intermediate its edges of substantially the diameter of the desired drop-center base, and tapering portions between said depressed portion and opposite edges of the blank, the combination comprising a set of segmental dies mounted radially outside a blank-working position, means for moving said dies radially into position in which they contact the depressed portion of said blank while floating axially, a pair of dies axially movable through said blank-working position and including an upper die and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower die to be contacted by said segmental dies as aforesaid, and means for thereafter imparting movement in opposite directions to said upper and lower dies relatively to said axially floating segmental die whereby to force said upper and lower dies against oppositely tapering portions of the interior of the blank, and means controlled by relative movement of said dies to move said axially floating dies out of the way of an approaching die, in case of operation of said machine without insertion of a blank between said dies.

6. In a machine for forming a drop-center rim from an annular blank having a radially depressed annular portion intermediate its edges of substantially the diameter of the desired drop-center base, and tapering portions between said depressed portion and the opposite edges of the blank, the combination comprising a set of segmental dies mounted radially outside a blank-working position, fluid-pressure means for holding said dies normally in said outside radial position and for moving said dies radially inwardly into a position in which they contact the depressed portion of said blank when the machine is operated, a pair of dies axially movable through said blank-working position and including an upper and a lower die, said lower die being adapted to lead and said upper die to follow as said upper and lower dies approach the blank-working position, and said lower die being adapted to support the blank during such movement, means for effecting movement of said upper and lower dies in coordination with the radially inward movement of the segmental dies, to cause a blank supported on said lower dies to be contacted by said segmental dies as aforesaid, means supplementing said fluid-pressure means for maintaining said segmental dies normally outside blank-working position, whereby to prevent clashing between said upper die and segmental dies in case of failure of said fluid-pressure means, and means for imparting relative movement in opposite directions to said upper and lower dies relatively to said segmental dies after the blank is contacted by said segmental dies, whereby to force said upper and lower dies against oppositely tapering portions of the interior of the blank.

7. In a machine for forming a drop-center rim from an annular blank having a radially depressed annular portion intermediate its edges of substantially the diameter of the desired drop-center base, and tapering portions between said depressed portion and opposite edges of the blank, the combination with a set of segmental dies normally positioned radially outside a blank-working position, means including a lower axially movable die for moving a blank from a position above the set of segmental dies to said blank-working position between the segmental dies, means for moving said segmental dies radially inward into a position in which they contact the depressed portion of the blank after the lower axially movable die has moved down below the set of segmental dies, an upper axially movable die cooperating with said lower axially movable die and, by relative approach movement toward each other, engaging the oppositely tapering portions of the interior of the blank to force said portions against said segmental dies, said lower die being operated to lead and said upper die to follow as said upper and lower dies approach the blank-working position, and means for effecting said relative approach movement of the axially movable upper and lower dies against said tapering portions while said blank is contacted as aforesaid by said segmental dies and after the segmental dies have reached their final inward position, whereby to bend said tapering portions oppositely against said segmental dies.

8. In a machine for forming a drop-center rim from an annular blank having a radially depressed annular portion intermediate its edges of substantially the diameter of the desired drop-center base, and tapering portions between said depressed portion and opposite edges of the blank, the combination comprising a set of segmental dies normally positioned radially outside a blank-working position, means including a lower axially movable die, normally raised above said blank-working position, for moving a blank into coincidence with said blank-working position with the blank encircled by said segmental dies, the lower axially movable die passing to a position below the segmental dies in this movement, means for then moving said segmental dies radially inward into a position in which they engage the depressed portion of the blank, the segmental dies being mounted for axial floating movement with the blank, an upper axially movable die cooperating with said lower die to follow it down, and said upper and lower dies, by relative approach movement toward each other, engaging the oppositely tapered portions of the interior of the blank to force said portions against said segmental dies, and means for effecting said relative approach movement of the axially movable upper and lower dies against said tapering portions while said blank is engaged as aforesaid by said floating segmental dies, whereby to bend said tapering portions oppositely against said segmental dies.

9. In a machine for forming an annular article from an annular blank having a central groove, the combination comprising a set of segmental dies normally mounted radially outside a blank-working position, means including an axially movable lower die, normally raised above said blank-working position, for moving a blank into coincidence with said blank-working position, the lower axially movable die passing to a position below the segmental dies in this movement, means for then moving said segmental dies radially inward into a position in which they engage the central groove of the blank, an upper axially movable die cooperating with said lower die to follow it down, and said upper and lower dies, by subsequent relative approach movement toward each other, engaging the portions of the blank between said central groove and the blank margins, respectively, for forcing said portions against said segmental dies, and means for effecting said relative approach movements of said upper and lower dies to cause them to bear with equalized pressure against said portions of the blank while said blank is engaged as aforesaid by said segmental dies, whereby to bend said portions against the segmental dies.

ROBERT O. GREENSHIELDS.
OTTMAR E. SCHMIDT.
JOHN G. KAY.

REFERENCES CITED

The following references are of record in the file of this patent:

UNITED STATES PATENTS

| Number | Name | Date |
|---|---|---|
| Re. 21,490 | Lobdell | June 25, 1940 |
| 2,105,289 | Lobdell | Jan. 11, 1938 |
| 2,139,833 | LeJeune | Dec. 13, 1938 |
| 2,159,900 | LeJeune | May 23, 1939 |
| 2,181,020 | LeJeune | Nov. 21, 1939 |
| 2,181,848 | LeJeune | Nov. 28, 1939 |
| 2,185,347 | LeJeune | Jan. 2, 1940 |
| 2,291,393 | LeJeune | July 28, 1942 |
| 2,291,394 | LeJeune | July 28, 1942 |
| 2,295,852 | LeJeune | Sept. 15, 1942 |
| 2,324,982 | Kuhn | July 20, 1943 |
| 2,467,665 | Gogan | Apr. 19, 1949 |